No. 789,224. PATENTED MAY 9, 1905.
P. MANDEVILLE.
APPARATUS FOR HANDLING EGGS.
APPLICATION FILED OCT. 16, 1903.

No. 789,224. PATENTED MAY 9, 1905.
P. MANDEVILLE.
APPARATUS FOR HANDLING EGGS.
APPLICATION FILED OCT. 16, 1903.

Witnesses:
JB Weir
G. V. Homans.

Inventor:
Paul Mandeville,
by Bond, Adams, Pickard & Jackson
his Attys.

No. 789,224. PATENTED MAY 9, 1905.
P. MANDEVILLE.
APPARATUS FOR HANDLING EGGS.
APPLICATION FILED OCT. 16, 1903.

Witnesses:
JB Weir
G. V. Homans

Inventor:
Paul Mandeville,
by Bond Adams Pickard Jackson
his Attys.

No. 789,224. PATENTED MAY 9, 1905.
P. MANDEVILLE.
APPARATUS FOR HANDLING EGGS.
APPLICATION FILED OCT. 16, 1903.

Witnesses:
J. B. Weir
G. V. Homarus

Inventor:
Paul Mandeville,
by Bond Adams Pickard Jackson
his Attys.

No. 789,224. PATENTED MAY 9, 1905.
P. MANDEVILLE.
APPARATUS FOR HANDLING EGGS.
APPLICATION FILED OCT. 16, 1903.

Witnesses:
B. Weir
G. V. Homans

Inventor:
Paul Mandeville
by Bond, Adams, Pickard & Jackson
his Attys.

No. 789,224. Patented May 9, 1905.

UNITED STATES PATENT OFFICE.

PAUL MANDEVILLE, OF CHICAGO, ILLINOIS, ASSIGNOR OF ONE-HALF TO HIMSELF AND ONE-HALF TO SWIFT AND COMPANY, OF CHICAGO, ILLINOIS, A CORPORATION OF ILLINOIS.

APPARATUS FOR HANDLING EGGS.

SPECIFICATION forming part of Letters Patent No. 789,224, dated May 9, 1905.

Application filed October 16, 1903. Serial No. 177,351.

*To all whom it may concern:*

Be it known that I, PAUL MANDEVILLE, a citizen of the United States, residing at Chicago, in the county of Cook and State of Illinois, have invented certain new and useful Improvements in Apparatus for Handling Eggs, of which the following is a specification, reference being had to the accompanying drawings.

My invention relates to apparatus for handling eggs as an aid to candling, and has for its object to provide a new and improved apparatus constructed and arranged to carry the eggs to the candlers and to receive the candled eggs and carry them to the packers, meanwhile keeping separate the different grades into which the eggs are assorted by the candlers. I accomplish this object as illustrated in the drawings and as hereinafter described.

What I regard as new is set forth in the claims.

In the accompanying drawings.

Generally speaking, my invention in its most improved form comprises a pair of traveling carriers in the form of endless belts arranged in parallelism and extending from an apartment at one side of the candling-room to the opposite side of the candling-room. Such carriers serve to carry eggs placed upon them at one end into the candling-room, where the candlers stand along opposite sides of the apparatus, so as to be able to conveniently take the eggs from the carrier and candle them. A series of candling-lamps, preferably incandescent lights, hang over the carriers, so as to be conveniently accessible to the candlers. Between the said traveling carriers are a series of conveyers which extend from the inlet end of the candling-room through said room to an apartment at the opposite side thereof, where the eggs are discharged.

In the best form of the apparatus I provide a plurality of endless belts in different horizontal planes, one above the other, and each of said belts is divided longitudinally by one or more partitions which overlie the belts, so as to separate the space over each belt into two or more longitudinal compartments, which for convenience will be termed "conveyer-compartments." I thus provide a number of conveyer-compartments for receiving eggs of different grades as they are sorted out by the candlers.

In a double apparatus such as that above described—that is to say, one where operators are provided at both sides—duplicate conveyer-compartments are provided at opposite sides of the apparatus for eggs of the predominating quality; but for such qualities as are comparatively infrequent it is desirable that the same conveyer-compartments be employed by the operators at both sides of the apparatus, and to this end I provide chutes extending from the opposite sides of the apparatus to such conveyer-compartments, so that all the conveyer-compartments which are used in common by operators at both sides of the apparatus are conveniently accessible. The different conveyer-compartments extend into the delivery-room and the lower ones extend beyond the upper ones, so that the delivery ends of all are conveniently accessible to the operators charged with the duty of removing and packing the eggs. I also provide means for starting and stopping all the carriers or conveyers simultaneously and also for independently stopping and starting the different conveyers, as may be necessary from time to time.

Referring to the drawings, A indicates the apartment in which the traveling carriers receive the eggs to be candled and in which the driving mechanism is located. For convenience said apartment will be termed the "receiving-room."

B indicates the candling-room, and C the delivery-room, in which the candled eggs are removed and packed.

*a* indicates the partition between rooms A B, and *b* the partition between rooms B C.

Figure 1:
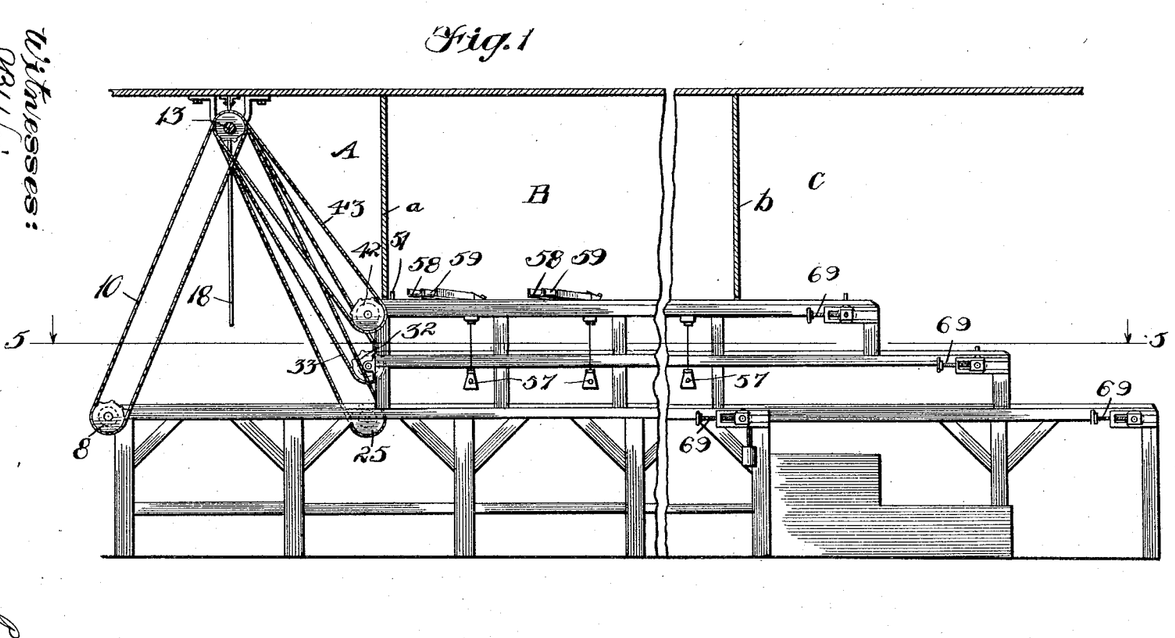
Figure 1 is a side elevation of the end portions of my improved apparatus.
Figure 2:
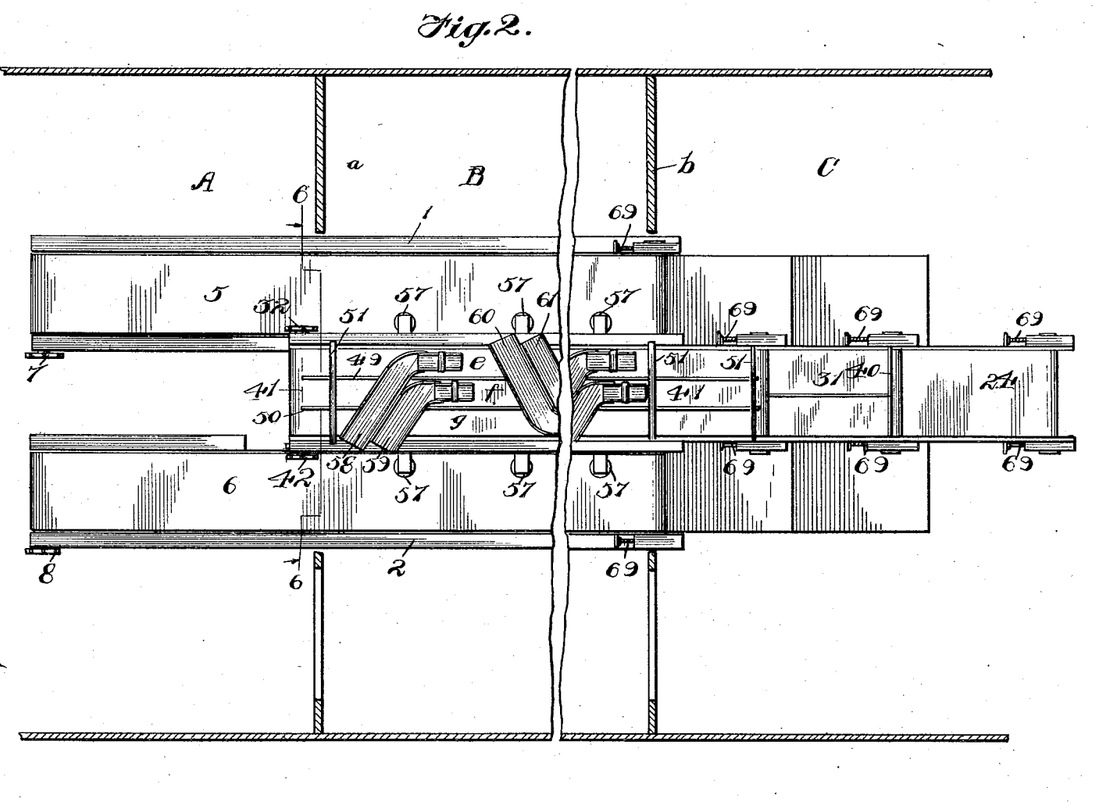
Fig. 2 is a plan view thereof.

1 2 indicate benches or frames, which carry rollers 3 4 at their ends adapted to receive endless belts 5 6, respectively. As best shown in Fig. 2, the belts 5 6 extend from the receiving-room A through the candling-room B and are arranged in parallelism, being spaced a short distance apart. The rollers 3 of the belts 5 6 are provided, respectively, with sprocket-wheels 7 8, connected by belts 9 10, respectively, with clutch members 11 12, loosely mounted on a shaft 13. (Best shown in Fig. 3.) The shaft 13 is provided with a pulley 14 or other suitable means for driving it.

15 indicates a clutch member feathered on the shaft 13 and adapted to move into engagement with the clutch member 11 for driving the belt 5. A lever 16 is provided for throwing the clutch 15 into and out of operative position.

17 indicates a similar clutch member, mounted on the shaft 13 and adapted to engage the clutch member 12 to drive the belt 6. A lever 18 is provided for operating the clutch member 17. Both the levers 16 18 are conveniently arranged so that the operator may actuate them.

20 21 indicate side rails extending along the sides of the belt 5, so as to keep the eggs resting thereon from rolling off. 22 23 indicate similar rails for the belt 6.

The belts 5 6, which serve to supply eggs to the operators, will for convenience be termed "carriers," while the belts which conduct assorted eggs from the candlers will be termed "conveyers." It will be understood, however, that this is purely an arbitrary use of terms.

Figure 3:
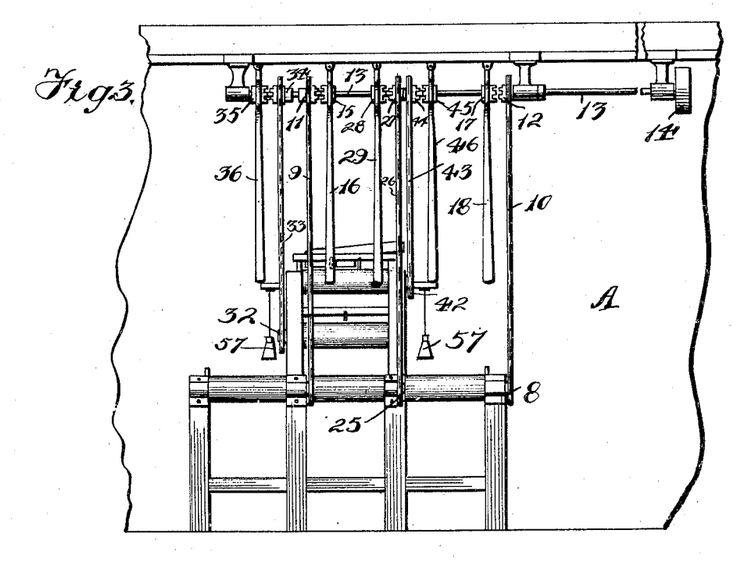
Fig. 3 is a view of one end of the apparatus.
Figure 4:
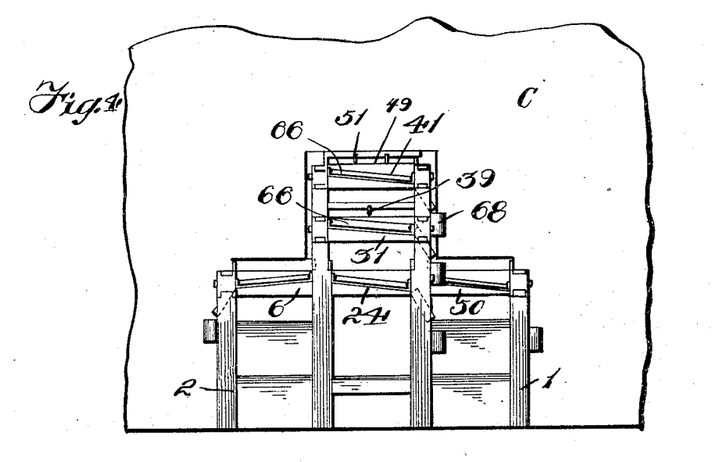
Fig. 4 is a view of the other end of the apparatus.

24 indicates one of the conveyers, consisting of an endless belt arranged between the carrier-belts 5 6, suitable rollers being provided to support said belt. As best shown in Fig. 2, said conveyer-belt 24 extends from the partition *a* through the candling-room into the delivery-room C. Said belt is driven by a sprocket-wheel 25, connected by a belt 26 with a clutch member 27, loosely mounted on the shaft 13 and adapted to be engaged by a clutch-section 28, mounted on a feather on said shaft and operated by a lever 29, as shown in Fig. 3. The conveyer 24 is preferably in the same horizontal plane as the carriers 5 6, and it is provided with side rails 29 30 similar to the side rails 20 21.

31 indicates a conveyer placed between the conveyer 24 and mounted in a similar way. As shown in Fig. 2, the delivery end of the conveyer 31 does not, however, extend as far into the delivery-room as the delivery end of the conveyer 24. The conveyer 31 is provided with a sprocket-wheel 32, connected by a belt 33 with a loose clutch member 34 on the shaft 13, which is adapted to be engaged by a clutch member 35, operated by a lever 36.

Figure 5:
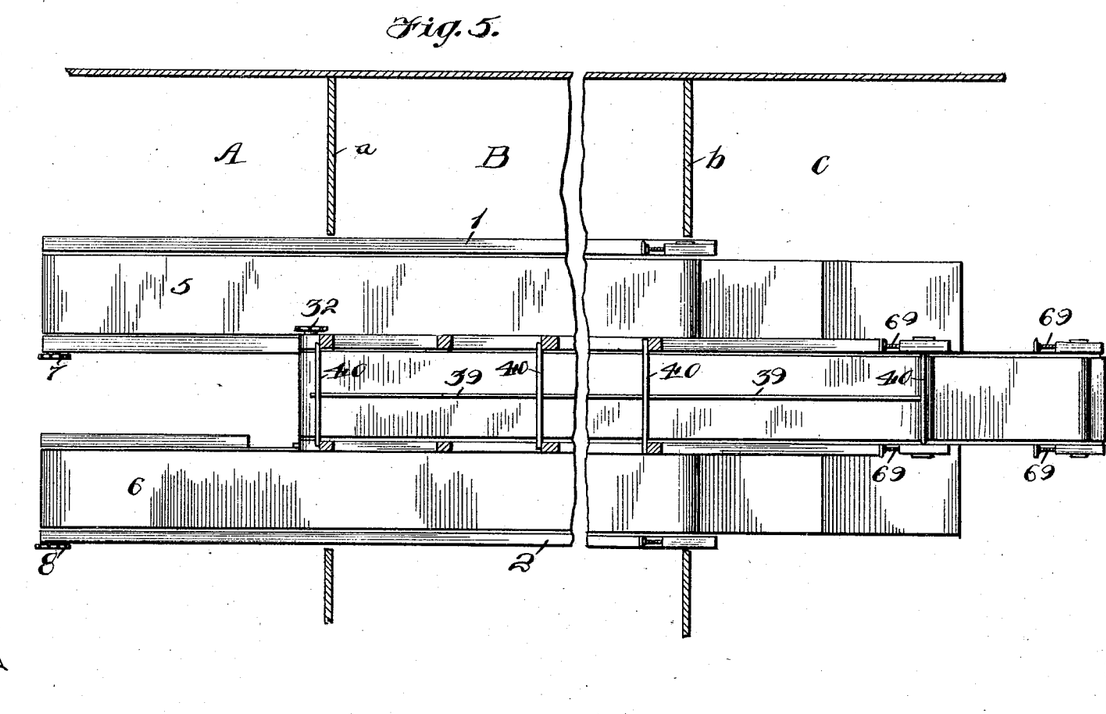
Fig. 5 is a horizontal section on line 5 5 of Fig. 1.
Figure 6:
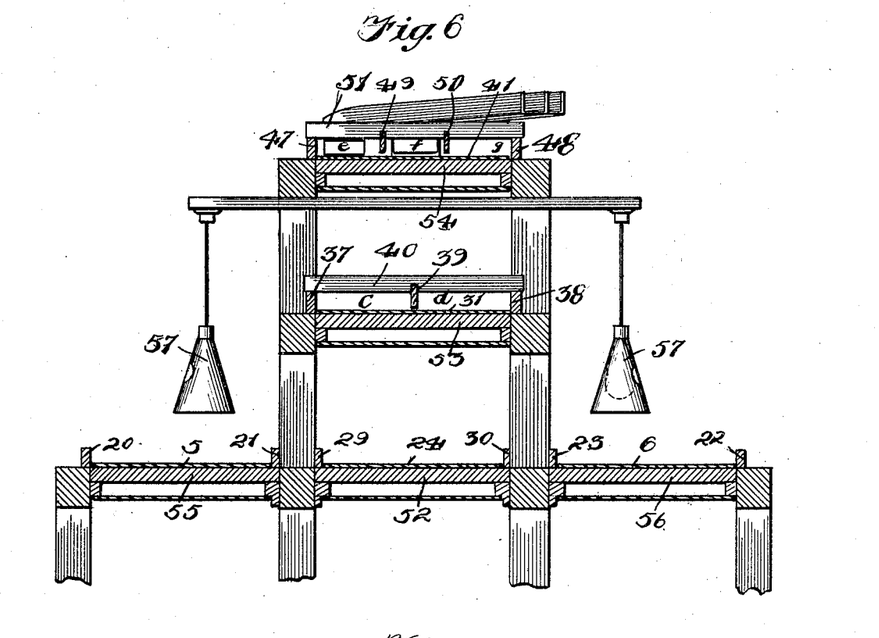
Fig. 6 is a cross-section on line 6 6 of Fig. 2.
Figure 7:
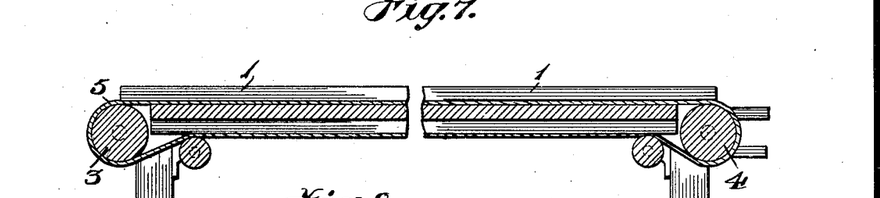
Fig. 7 is a longitudinal sectional view illustrating the construction of one of the conveyers.
Figure 8:
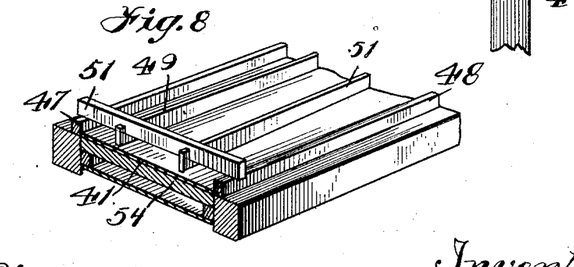
Fig. 8 is a perspective view of one of the conveyers, some parts being in section.

The conveyer 31 is provided with side rails 37 38 and is divided into a plurality of compartments *c d* by a rail 39, which extends longitudinally thereof, being supported by cross-bars 40, as best shown in Figs. 5 and 6. The rail 39 does not quite touch the upper surface of the conveyer 31, and therefore does not interfere with the freedom of movement thereof. It extends near enough to said conveyer, however, to prevent eggs from passing under it from one side to the other. I thus provide a plurality of conveyer-compartments on a single belt. Obviously eggs placed in either of the conveyer-compartments *c d* will be carried along, but will nevertheless be prevented from intermingling.

41 indicates a third conveyer arranged over the conveyer 31 and driven by a sprocket-wheel 42. The sprocket-wheel 42 is driven by a belt 43, which is driven by a loose clutch member 44, mounted on the shaft 13 and adapted to be engaged by a clutch member 45, operated by a lever 46. By this construction it will be seen that either of the conveyers may be started or stopped separately. Also the carriers may be stopped or started independently of each other and of the conveyers. All the conveyers and carriers may be stopped or started simultaneously by stopping or starting the shaft 13.

The conveyer 41 is provided with side rails 47 48, and it is also divided into three conveyer-compartments by longitudinal partitions 49 50, supported by cross-bars 51, which rest on the rails 47 48, as shown in Figs. 2 and 6. The conveyer 41 is shorter than the conveyer 31, so that it does not extend quite so far into the delivery-room. Thus the delivery ends of all of the conveyers are readily accessible to the packers.

In order to prevent the different conveyers from sagging under their loads, I provide tables 52 53 54, respectively, which extend under them, as shown in Fig. 6. Similarly, tables 55 56 are provided under the carriers 5 6.

57 indicates a series of candlers' lamps, which are suspended over the carriers 5 6, as illustrated in Figs. 2 and 6.

It will be noted that the conveyer 24 is twice as wide as each of the conveyer-compartments *c d* and that each of the conveyer-compartments *e*, *f*, and *g*, into which the conveyer 41 is divided, is one-third as wide as the conveyer 24. This arrangement is provided for the reason that there are comparatively few eggs of certain grades, and consequently conveyers of less capacity are required for them than for others. In the apparatus illustrated and described I have provided for six grades of eggs, the largest conveyer or conveyer-compartment 24 being intended to receive the grade of which there are the greatest number. Since this conveyer extends adjacent to both carriers 5 6, it may be used by operators at both sides of the apparatus.

Conveyer 31, being divided into two conveyer-compartments, may be used for two distinct grades. Said conveyer is low enough so that both of its conveyer-compartments may readily be reached by operators at both sides of the apparatus. Conveyer 41, however, is so high that the operators at one side of the apparatus cannot conveniently reach to the conveyer-compartment at the opposite side thereof. I therefore provide chutes 58 59, which extend from one side of the apparatus to conveyer-compartments *e f*, respectively, and chutes 60 61, which extend from the opposite side of the apparatus to conveyer-compartments *g f*, respectively, as best shown in Fig. 2. Thus all the different conveyer-compartments of the conveyer 41 are made conveniently accessible from both sides of the apparatus.

In order to avoid damaging eggs delivered from the different chutes, they are provided with inclined lips 62, which conduct the eggs down to the conveyer-belt. Said lips are hinged, as shown at 63 in Fig. 12, so that they may ride over the eggs already on the belt, and they are also provided with hinged cover-plates 64, which extend over them, so as to prevent the eggs rolling down the lips 32 from being thrown violently against the eggs already on the conveyer. The cover-plate 64 is hinged to suitable supports 65, so as to rise and fall with the lips 62.

Figures 9, 10, 11, 12:
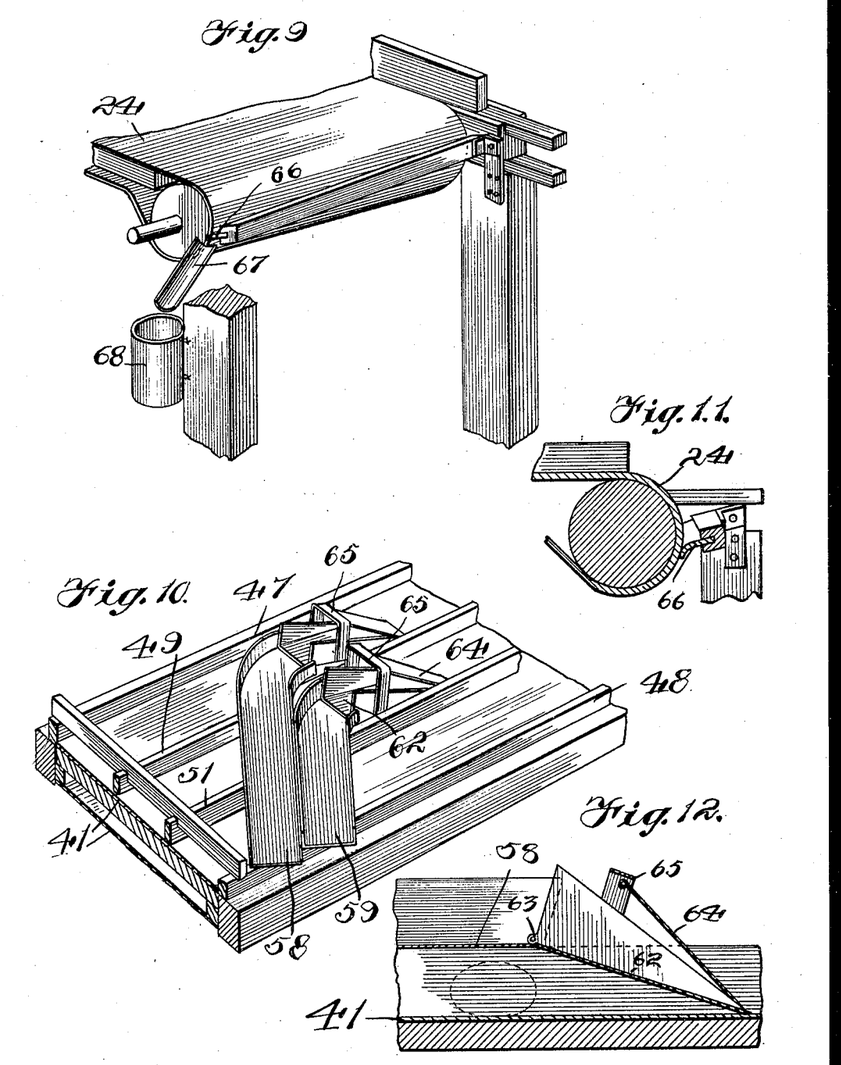
Fig. 9 is a perspective view illustrating the discharge end of one of the conveyers.
Fig. 10 is a perspective view illustrating one of the upper conveyers.
Fig. 11 is a partial longitudinal section of the discharge end of one of the conveyers.
Fig. 12 is an enlarged detail, being a partial longitudinal section of one of the upper conveyers.

As the eggs are carried out of the candling-room by the conveyers they are taken by operators from the ends of the conveyers and packed in appropriate cases. Broken eggs and other waste matter are removed by means of scrapers 66, arranged in an inclined position across the delivery ends of the conveyers, as shown in Figs. 9 and 11, so that any fluid matter flows down the scrapers over troughs 67 into receptacles 68 placed to receive it.

69 indicates adjusting-screws for adjusting the different pulleys toward and from each other to vary the tension of the different conveyers and carriers.

While I have described specifically the embodiment of my invention illustrated in the accompanying drawings, I wish it to be understood that my invention is not restricted to the specific details of the construction described, except in so far as they are particularly claimed, but includes the generic invention set forth in the broader claims.

That which I claim as my invention, and desire to secure by Letters Patent, is—

1. An apparatus for handling eggs, comprising a candling-chamber, egg-testing means, means for conducting eggs thereto, a plurality of conveyers adapted to receive the tested eggs, and means for driving said conveyers independently of said conducting means, substantially as described.

2. An apparatus for handling eggs, comprising a candling-chamber, egg-testing means, means for conducting eggs thereto, a plurality of conveyers in different horizontal planes in said candling-chamber for receiving the tested eggs, and means for driving said conveyers, substantially as described.

3. An apparatus for handling eggs, comprising a candling-chamber, egg-testing means, means for conducting eggs thereto, a conveyer adapted to receive the tested eggs, stationary means dividing the upper surface of said conveyer into a plurality of conveyer-compartments, and means for driving said conveyer, substantially as described.

4. An apparatus for handling eggs, comprising a candling-chamber, egg-testing means, means for conducting eggs thereto, a conveyer adapted to receive the tested eggs, a stationary longitudinally-extending partition dividing the upper surface of said conveyer into a plurality of conveyer-compartments, and means for driving said conveyer, substantially as described.

5. An apparatus for handling eggs, comprising a candling-chamber, egg-testing means, a traveling carrier for conducting eggs thereto, a plurality of separate conveyer-compartments adjacent to said carrier adapted to receive and separate eggs of different grades, and driving mechanism, substantially as described.

6. An apparatus for handling eggs, comprising a traveling carrier adapted to supply eggs to the candlers, a plurality of conveyer-compartments adjacent to said carrier adapted to receive and carry away the assorted eggs, driving mechanism, and means for starting and stopping said carrier independently of said conveyer mechanism, substantially as described.

7. An apparatus for handling eggs, comprising a candling-chamber, egg-testing means, a plurality of traveling carriers arranged in parallelism, and means lying between said carriers adapted to receive and carry away the assorted eggs, substantially as described.

8. An apparatus for handling eggs, comprising a plurality of traveling carriers arranged in parallelism, and a plurality of conveyer-compartments arranged adjacent for said traveling carriers for receiving and guiding the assorted eggs, substantially as described.

9. An apparatus for handling eggs, comprising a plurality of traveling carriers arranged in parallelism, and a plurality of conveyer-compartments arranged adjacent to said carriers for receiving and guiding the assorted eggs, said conveyer-compartments being in different horizontal planes, substantially as described.

10. An apparatus for handling eggs, comprising a plurality of traveling carriers arranged in parallelism, means for stopping and starting said carriers independently of each other, a plurality of conveyer-compartments arranged adjacent to said carriers for receiving and guiding the assorted eggs, one or more conveyers for said conveyer-compartments, and means for starting and stopping the latter conveyers independently of said carriers, substantially as described.

11. An apparatus for handling eggs, comprising a traveling carrier adapted to conduct eggs, a conveyer arranged adjacent to said carrier for receiving and carrying away the assorted eggs, means dividing the space above said conveyer longitudinally into a plurality of conveyer-compartments, and means for conducting eggs over one of said conveyer-compartments to the other, substantially as described.

12. An apparatus for handling eggs, comprising a traveling carrier adapted to conduct eggs, a conveyer arranged adjacent to said carrier for receiving and carrying away the assorted eggs, means dividing the space above said conveyer longitudinally into a plurality of conveyer-compartments, and a chute extending over one of said conveyer-compartments to the other, substantially as described.

13. An apparatus for handling eggs, comprising a traveling carrier adapted to conduct eggs, a conveyer arranged adjacent to said carrier for receiving and carrying away the assorted eggs, means dividing the space above said conveyer longitudinally into a plurality of conveyer-compartments, a chute extending over one of said conveyer-compartments to the other, and a swinging lip for said chute, substantially as described.

14. An apparatus for handling eggs, comprising a traveling carrier adapted to conduct eggs, a conveyer arranged adjacent to said carrier for receiving and carrying away the assorted eggs, means dividing the space above said conveyer longitudinally into a plurality of conveyer-compartments, a chute extending over one of said conveyer-compartments to the other, a swinging lip for said chute, and a cover-plate for said lip, substantially as described.

15. An apparatus for handling eggs, comprising a plurality of traveling carriers arranged in parallelism, a conveyer between said traveling carriers, means dividing said conveyer into a plurality of compartments, and chutes extending from each side of said conveyer to the compartment at the opposite side thereof, substantially as described.

16. An apparatus for handling eggs, comprising a plurality of conveyers in different horizontal planes, the lower conveyers extending beyond the upper ones, and means adjacent to said conveyers for supplying eggs to the candlers, substantially as described.

17. The combination of a candling-room, receiving and delivery rooms adjacent to said candling-room, a carrier extending from said receiving-room into said candling-room, means in said candling-room and extending into said delivery-room for receiving and carrying away the candled eggs, and means for driving said carrier independently of said receiving and carrying means, substantially as described.

18. The combination of a candling-room, receiving and delivery rooms adjacent to said candling-room, a traveling carrier extending from said receiving-room into said candling-room for supplying eggs, a plurality of stationary conveyer-compartments in said candling-room and extending therefrom into said delivery-room, conveyer mechanism for conducting the eggs in said conveyer-compartments, and means in said receiving-room for starting and stopping said carrier and said conveyer-compartments, substantially as described.

19. An apparatus for handling eggs, comprising means for supplying eggs to the candlers, a conveyer adapted to receive the eggs from the candlers, stationary means dividing the upper surface of said conveyer into a plurality of conveyer-compartments, and means for driving said conveyer, substantially as described.

20. An apparatus for handling eggs, comprising means for supplying eggs to the candlers, a conveyer adapted to receive the eggs from the candlers, a stationary partition dividing the upper surface of said conveyer into a plurality of conveyer-compartments, and means for driving said conveyer, substantially as described.

21. An apparatus for handling eggs, comprising means for supplying eggs to the candlers, a conveyer adapted to receive the eggs from the candlers, a partition dividing the upper surface of the conveyer into a plurality of conveyer-compartments, means independent of said conveyer for supporting said partition, and means for driving said conveyer, substantially as described.

22. An apparatus for handling eggs, comprising a candling-chamber, egg-testing means, a conveyer adapted to receive the tested eggs, stationary means dividing the upper surface of said conveyer into a plurality of conveyer-compartments, and means for driving said conveyer, substantially as described.

23. An apparatus for handling eggs, comprising a plurality of conveyer-compartments adapted to receive assorted eggs, a traveling carrier, and independent means for operating said carrier, substantially as described.

24. An apparatus for handling eggs, comprising a traveling carrier, a plurality of conveyer-compartments arranged adjacent to said carrier for receiving and guiding assorted eggs, one or more conveyers for said conveyer-compartments and means for starting and stopping the latter conveyers independently of said carrier, substantially as described.

25. An apparatus for handling eggs, comprising a conveyer for receiving and carrying away assorted eggs, means dividing the space above said conveyer longitudinally into a plurality of conveyer-compartments, and means for conducting eggs over one of said conveyer-compartments to another, substantially as described.

26. An apparatus for handling eggs, comprising a candling-chamber, egg-testing means, means for conducting eggs thereto, a plurality of conveyers arranged one above another in said candling-chamber for receiving the tested eggs, and means for driving said conveyers, substantially as described.

27. An apparatus for handling eggs, comprising a candling-chamber, egg-testing means, means for conducting eggs thereto, a plurality of conveyers in different horizontal planes adapted to receive the tested eggs, and means for driving said conveyers independently of said conducting means, substantially as described.

28. An apparatus for handling eggs, comprising a candling-chamber, egg-testing means, a traveling carrier for conducting eggs thereto, a plurality of conveyer-compartments adjacent to said carrier adapted to receive assorted eggs, means independent of said carrier for moving the eggs in said conveyer-compartments, and driving mechanism, substantially as described.

PAUL MANDEVILLE.

Witnesses:
W. A. GREENE,
F. A. WHEELER.